(12) United States Patent
Oh et al.

(10) Patent No.: US 10,579,180 B2
(45) Date of Patent: Mar. 3, 2020

(54) SECURITY APPARATUS HAVING FORCE-BASED TOUCH INTERFACE

(71) Applicant: HYUNDAI MOTOR COMPANY, Seoul (KR)

(72) Inventors: Kwang Myung Oh, Suwon-si (KR); Sung Min Park, Seoul (KR); Sung Jin Sah, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 74 days.

(21) Appl. No.: 15/366,873

(22) Filed: Dec. 1, 2016

(65) Prior Publication Data

US 2017/0351370 A1    Dec. 7, 2017

(30) Foreign Application Priority Data

Jun. 7, 2016  (KR) ........................ 10-2016-0070392

(51) Int. Cl.
| | |
|---|---|
| *G09G 1/00* | (2006.01) |
| *G06F 3/041* | (2006.01) |
| *G06F 21/31* | (2013.01) |
| *G06F 21/32* | (2013.01) |

(52) U.S. Cl.
CPC .......... *G06F 3/0414* (2013.01); *G06F 3/0416* (2013.01); *G06F 21/31* (2013.01); *G06F 21/32* (2013.01); *G06F 2203/04105* (2013.01)

(58) Field of Classification Search
CPC .......... G06F 3/041; G06F 3/045; G06F 21/32; G06K 9/00; G06K 5/00; G06T 1/00
See application file for complete search history.

(56) References Cited

U.S. PATENT DOCUMENTS

| | | |
|---|---|---|
| 5,038,142 A | 8/1991 | Flower et al. |
| 8,674,947 B2 | 3/2014 | Henderson et al. |
| 8,711,109 B2 | 4/2014 | Algreatly |
| (Continued) | | |

FOREIGN PATENT DOCUMENTS

| | | |
|---|---|---|
| EP | 1956813 B1 | 4/2016 |
| JP | 2015-099607 A | 5/2015 |
| KR | 10-2012-0130971 A | 12/2012 |

OTHER PUBLICATIONS http://leesihouse.tistory.com/54.
(Continued)

*Primary Examiner* — Michael A Faragalla
(74) *Attorney, Agent, or Firm* — Morgan, Lewis & Bockius LLP

(57) ABSTRACT

A security apparatus having a force-based touch interface includes: a touch input including a touch plate for a touch input and a force sensor spaced apart at a predetermined distance by a connection member in a direction perpendicular to a touch surface of the touch plate and measuring a pressing force applied to the touch plate at a plurality of measurement points; and a processor configured to recognize directions of a shear force using magnitudes of the pressing force measured by the force sensor, to compare the recognized directions of the shear force with directions of a shear force of a previously registered security code, and to determine whether to disable security according to a comparison result.

7 Claims, 10 Drawing Sheets

(56) References Cited

U.S. PATENT DOCUMENTS

| | | | | |
|---|---|---|---|---|
| 8,988,191 B2* | 3/2015 | Zhang | ................... | G06F 21/32 |
| | | | | 340/5.53 |
| 9,030,419 B1 | 5/2015 | Freed | | |
| 2002/0054153 A1 | 5/2002 | Arnold | | |
| 2012/0105358 A1* | 5/2012 | Momeyer | ............ | G06F 3/0414 |
| | | | | 345/174 |
| 2012/0169617 A1 | 7/2012 | Maenpaa | | |
| 2012/0286847 A1 | 11/2012 | Peshkin et al. | | |
| 2013/0217330 A1* | 8/2013 | Gardenfors | ......... | H04M 1/7253 |
| | | | | 455/41.2 |
| 2013/0342501 A1* | 12/2013 | Molne | .................. | G06F 3/0414 |
| | | | | 345/174 |
| 2014/0104207 A1* | 4/2014 | Park | ....................... | G06F 3/041 |
| | | | | 345/173 |

OTHER PUBLICATIONS

Chris Harrison et al., "Using Shear as a Supplemental Two-Dimensional Input Channel for Rich Touchscreen Interaction", CHI '12 Proceedings of the SIGCHI Conference on Human Factors in Computing Systems, Austin, Texas, USA, May 5-10, 2012, pp. 3149-3152.

Seongkook Heo et al., "Indirect Shear Force Estimation for Multi-Point Shear Force Operations", CHI '13 Proceedings of the SIGCHI Conference on Human Factors in Computing Systems, Paris, France, Apr. 27-May 2, 2013, pp. 281-284.

* cited by examiner

SECURITY APPARATUS HAVING FORCE-BASED TOUCH INTERFACE

CROSS-REFERENCE TO RELATED APPLICATION

This application is based on and claims the benefit of priority to Korean Patent Application No. 10-2016-0070392, filed on Jun. 7, 2016, in the Korean Intellectual Property Office, the disclosure of which is incorporated herein in its entirety by reference.

TECHNICAL FIELD

The present disclosure relates to a security apparatus having a force-based touch interface, capable of strengthening security using a force-based interface recognizing a shear force.

BACKGROUND

In general, a security apparatus is used for access control, system security of a terminal such as a mobile terminal or a tablet computer, and the like. For example, in order to control visitor access, a door locking device is installed at entrances of houses or offices and the use of someone else is restricted by registering a password, a touch pattern, a fingerprint, and the like, in smartphones.

Recently, electronic door locking devices having various recognizing means such as password input, biometrics, and the like, rather than a mechanical door locking device using a key, or the like, have been used.

Among door locking devices, a door locking device using a touch scheme has the following problems.

First, since a fingerprint remains on a surface of touch glass, a password is easily exposed to someone else.

Second, the door locking device using a touch scheme is high in price and a touch input is limited when a user wears gloves.

Third, since a specific region in which numbers are displayed is required to be touched, it is difficult for a person with weak eyesight or a visually impaired to use, and someone else may easily figure out a password through a hidden camera.

Fourth, since a password is generated according to a number combination scheme, security is low.

SUMMARY

The present disclosure has been made to solve the above-mentioned problems occurring in the prior art while advantages achieved by the prior art are maintained intact.

An aspect of the present disclosure provides a security apparatus having a force-based touch interface, capable of strengthening security using a force-based touch interface recognizing a shear force.

Another aspect of the present disclosure provides a security apparatus having a force-based touch interface, which may be used with high security by utilizing a force sensor such as a strain gauge.

According to an exemplary embodiment of the present disclosure, a security apparatus having a force-based touch interface includes: a touch input including a touch plate for a touch input, and a force sensor spaced apart at a predetermined distance by a connection member in a direction perpendicular to a touch surface of the touch plate and measuring a pressing force applied to the touch plate at a plurality of measurement points; and a processor configured to recognize directions of a shear force using magnitudes of the pressing force measured by the force sensor, to compare the recognized directions of the shear force with directions of a shear force of a previously registered security code, and to determine whether to disable security according to a comparison result.

The force sensor may include three or more force sensors connected to a surface opposing the touch surface of the touch plate through the connection member.

The force sensors may measure the pressing force in mutually different positions.

The force sensors may be strain gauges.

The processor may include: a controller recognizing directions of a shear force by tracking a change in a trace of a touch position using magnitudes of a pressing force measured through a plurality of force sensors of the force sensor; and a security processor comparing the directions of the shear force recognized by the controller with directions of a shear force of a previously registered security code, and disabling security or maintaining a security operation according to a comparison result.

The controller may calculate a touch position using the measured magnitudes of the pressing force and calculate a direction of a shear force using a difference between the calculated touch position and a previously calculated touch position.

The controller may determine the number of repeated inputs in a direction of a corresponding shear force according to an input time at which the same direction of a shear force is input.

The processor may output a feedback according to the number of repeated inputs.

According to another exemplary embodiment of the present disclosure, a security apparatus having a force-based touch interface includes: a touch input including a touch pad measuring a corresponding touch point when a touch input is applied to a touch surface of a touch plate, and a force sensor spaced apart at a predetermined distance by a connection member in a direction perpendicular to the touch surface and measuring a pressing force applied to the touch plate at a plurality of measurement points; and a processor configured to recognize a touch input order according to a touch input applied to the touch input, to compare the recognized touch input order with a touch input order of a previously registered security code, and to determine whether to disable security.

The touch pad may use any one touch recognition technology among resistive overlay, capacitive overlay, a surface acoustic wave, and an infrared beam.

The force sensor may include three or more force sensors connected to a surface opposing the touch surface of the touch plate through the connection member.

The force sensors may be strain gauges.

The processor may include: a first controller recognizing directions of a shear force by tracking a change in a trace of a touch position using magnitudes of a pressing force measured through a plurality of force sensors of the force sensor; a second controller controlling the touch pad to recognize touch positions where a touch input has been applied; and a security processor comparing the directions of the shear force recognized by the first controller and the touch positions recognized by the second controller with directions of a shear force and touch positions of a previously registered security code, and disabling security or maintaining a security operation according to a comparison result.

The first controller may calculate a touch position using the measured magnitudes of the pressing force and calculate a direction of a shear force using a difference between the calculated touch position and the touch position recognized by the second controller.

The first controller may calculate a vector based on the touch position recognized through the touch pad, as a start point, and the touch position recognized through the force sensor, as an end point.

The processor may provide a touch input training function before or after security code registration such that a user's touch input method is uniform.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Terms of "comprise" and variations such as "includes", "comprises" or "has" described in this disclosure will be understood to imply the inclusion of stated elements but not the exclusion of any other elements, unless explicitly described to the contrary.

In addition, the terms "-er", "-or" and "module" described in the specification mean units for processing at least one function and operation and can be implemented by hardware components or software components and combinations thereof. Articles such as "a" or "the" may include plural forms unless referred to the contrary in context describing the present disclosure.

Hereinafter, exemplary embodiments of the present disclosure will be described in detail with reference to the accompanying drawings.

The present disclosure proposes a security apparatus having a force-based touch interface, capable of recognizing a magnitude, a direction, and the like, of a shear force generated when a touch input is applied through a force sensor. Here, the shear force is a force generated in a transverse direction of a touch surface of a touch interface when a certain point of the touch surface is pressed in a diagonal direction, rather than being pressed in an accurately vertical direction, which is also called a frictional force.

The security apparatus having a force-based touch interface proposed in this disclosure may be applied to a mobile terminal, a portable computer, a vehicle glove box locking device, a door locking device, or a digital doorlock, and the like.

Figure 1:
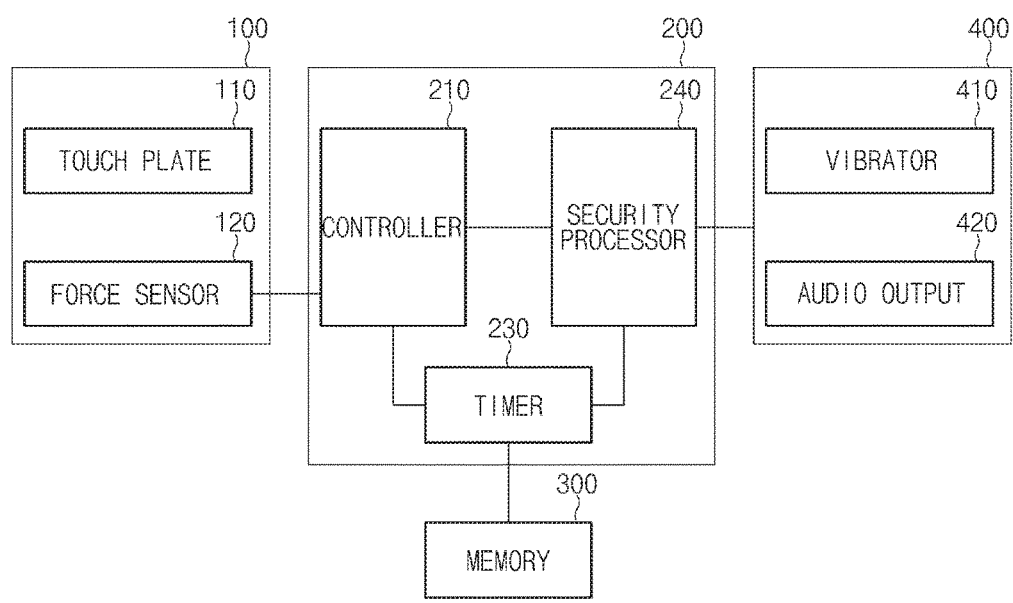
FIG. 1 is a block diagram of a security apparatus having a force-based touch interface according to an exemplary embodiment of the present disclosure.

FIG. 1 is a block diagram of a security apparatus having a force-based touch interface according to an exemplary embodiment of the present disclosure.

As illustrated in FIG. 1, a security apparatus includes a touch input 100, a processor 200, a memory 300, and an output 400.

The touch input 100, a force-based touch interface, includes a touch plate 110 and a force sensor 120.

The touch plate 110 receives a force touch. The touch plate 110 may have a flat plate or curved plate shape, and may be formed of various materials such as glass or plastic. The force sensor 120 senses the force touch applied to a certain point of the touch plate 110. The force touch refers to a behavior of applying a pressing force having directionality with a predetermined magnitude or greater when touching the certain point on a surface of the touch plate 110.

The force sensor 120 includes three or more force sensors. Each of the force sensors measures a magnitude (strength) of pressing forces in mutually different positions. That is, the force sensor 120 outputs magnitudes of a plurality of pressing forces measured at a plurality of different measurement points. The force sensors measure a magnitude of a pressing force at a predetermined period, and temporarily store the measured data in the memory 300.

Here, a strain gauge measuring a strain rate by a touch force may be used as the force sensor.

The processor 200 includes a controller 210, a timer 230, and a security processor 240.

When a force touch is applied to one point of the touch plate 110, the controller 210 receives signals measured (sensed) at respective measurement points (sensing points) from the plurality of force sensors. The controller 210 calculates a touch position and a magnitude and a direction of a shear force on the basis of the magnitudes of the plurality of pressing forces.

Here, the controller 210 calculates the touch position using a touch position calculation algorithm. The controller 210 calculates the touch position by substituting the touch position to a force-moment equation. The controller 220 calculates the direction of the shear force on the basis of a trace of the calculated touch positions. In other words, the controller 210 tracks touch positions according to a change in a direction of the pressing force while the force touch is being applied, and calculates the direction of the shear force on the basis of a change in the trace of the touch positions.

The controller 210 determines the number of repeated inputs of the corresponding force touch according to a time during which a pressing force having the same direction and/or same magnitude is input. For example, when a pressing force is input for three seconds or longer in one direction, the controller 210 recognizes that the shear force is repeatedly input twice in the same direction.

The timer 230 measures time, and when a predetermined time has lapsed, the timer 230 generates an event signal. The processor 220 may have one or more timers 230.

When there is a request for registering a security code from the user, the security processor 240 executes registration of a security code according to a determined procedure. A security code is generated using one or more of a touch position and a magnitude and a direction of a shear force. For example, the security code may be generated by combining shear force directions (pressing force directions) or generated by combining touch positions and shear force directions.

When there is a request for registering a security code, the security processor 240 controls the controller 210 to activate the touch input 100. The security processor 240 senses a force touch through the controller 210 and generates a security code using data input by the force touch. In addition, the security processor 240 registers (sets) the generated security code and stores the registered (or set) security code in the memory 300.

Thereafter, when there is a request for disabling security, the security processor 240 activates the touch input 100 and receives the security code from the user. The security processor 240 determines whether the security code input by the user matches the previously registered security code.

When the input security code matches the previously registered security code, the security processor 240 disables the security. If, however, the input security code does not match the previously registered security code, the security processor 240 maintains a security operation. Here, security processor 240 informs the user about the mismatch between the input security code and the previously registered security code, in a form of one or more of visual information, audible information, and tactile information.

When the mismatch between the input security code and the previously registered security code is repeated by more than a determined number of times, the security processor 240 limits touch input during a determined time.

The memory 300 stores a mapping table, a security code, an audio signal, and the like. The memory 300 temporarily stores a force touch input applied through the touch input 100.

The memory 300 stores software for controlling an operation of the security apparatus, an algorithm for calculating a magnitude and a direction of a shear force, and the like. Input/output data according to an operation of the security apparatus is stored in the memory 300.

The output 400 outputs feedback, a sound effect, a warning signal, and the like, according to a touch input under the control of the processor 200. The output 400 includes a vibrator 410 and an audio output 420. The output 400 may include a display (not shown) for displaying visual information.

The vibrator 410 generates a vibration strength and a vibration pattern corresponding to a force touch. In other words, the vibration strength and the vibration pattern vary depending on the magnitude and the direction of the shear force and the number of repeated inputs. The vibrator 410 may synthesize different vibrations and outputs or sequentially outputs the synthesized vibrations.

The various embodiments disclosed herein, including embodiments of the security apparatus and/or elements thereof, can be implemented using one or more processors coupled to a memory (or other non-transitory machine readable recording medium) storing computer-executable instructions for causing the processor(s) to perform the functions described above including the functions described in relation to the touch input 100, the processor 200, the memory 300, and the output 400.

Figure 2:
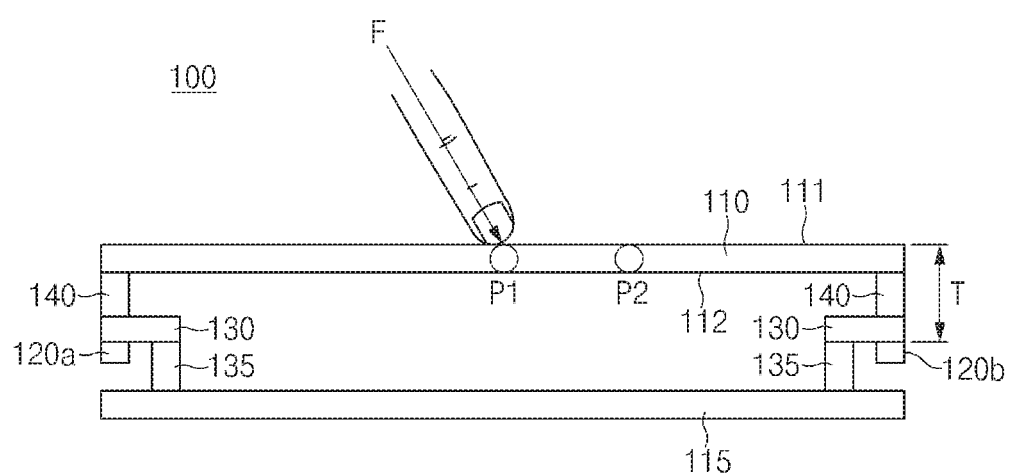
FIG. 2 is a view illustrating a structure of a touch input 100 illustrated in FIG. 1.

FIG. 2 is a view illustrating a structure of the touch input 100 illustrated in FIG. 1.

As illustrated in FIG. 2, the touch input 100 includes the touch plate 110, the force sensor 120, an elastic body 130, a support 135, and a connection member 140.

As illustrated in FIG. 2, the touch plate 110 may be implemented in the form of a planar pad. In this embodiment, a case in which the touch pad 130 is implemented in the form of a planar pad is described as an example, but the present disclosure is not limited thereto and the touch plate 110 may also have a curved plate shape.

A first surface 111 of the touch plate 110 is a touch surface to which a force touch is applied. The touch plate 110 senses a force touch of an object such as a user's finger, a stylus, and the like, on the first surface 111.

One end of the connection member 140 is connected to a second surface 112 of the touch plate 110, and another end thereof is connected to one end of the elastic body 130. That is, the connection member 140 connects the touch plate 110 and the elastic body 130.

The support 135 and a force sensor 120a or 120b are disposed at another end of the elastic body 130. The force sensor 120a or 120b is installed to be spaced apart from the second surface 112 of the touch plate 110 at a determined distance T. The force sensors 120a and 120b measure a pressing force F applied to the first surface 111 of the touch plate 110 in installation positions thereof when a force-based touch is applied. Here, the distance T between the first surface 111 of the touch plate 110 and the force sensor 120a or 120b may be adjusted according to specification of a device to which the touch input 100 is applied.

The elastic body 130 is deformed in a vertical direction of the first surface 111 of the touch plate 110 by a pressing force applied to the first surface 111, thus transferring the force to the pressing force sensors 120a and 120b of the force sensor 120.

The support 135 supports the elastic body 130 and connects the elastic body 130 to a base plate 115.

When a touch input is applied, the structure of the touch input 100 facilitates generation of a shear force to allow the shear force to be precisely recognized.

Hereinafter, a method for calculating a touch position in a force-based touch interface will be described. Here, as illustrated in FIG. 2, a case in which two force sensors 120a and 120b are respectively installed at different points below the touch plate 110 will be described as an example.

As illustrated in FIG. 2, when a user's finger, applying a pressing force, contacts one point of the first surface 111 of the touch plate 110 (force touch), the controller 210 calculates a point touched by an object, as a first touch position P1, on the basis of data measured by the force sensors 120a and 120b when the object contacts the first surface 111. In other words, the first touch position P1, a touch position calculated at an initial stage of input of the force touch, refers to a point that the user's finger has actually touched.

Thereafter, when the user's finger on the first surface 111 of the touch plate 110 changes a direction of the pressing force, the controller 210 calculates a second touch position P2 using data measured through the force sensors 120a and 120b.

Here, the controller 210 calculates the touch positions P1 and P2 according to a force touch input using a force-moment equation.

Figure 3:
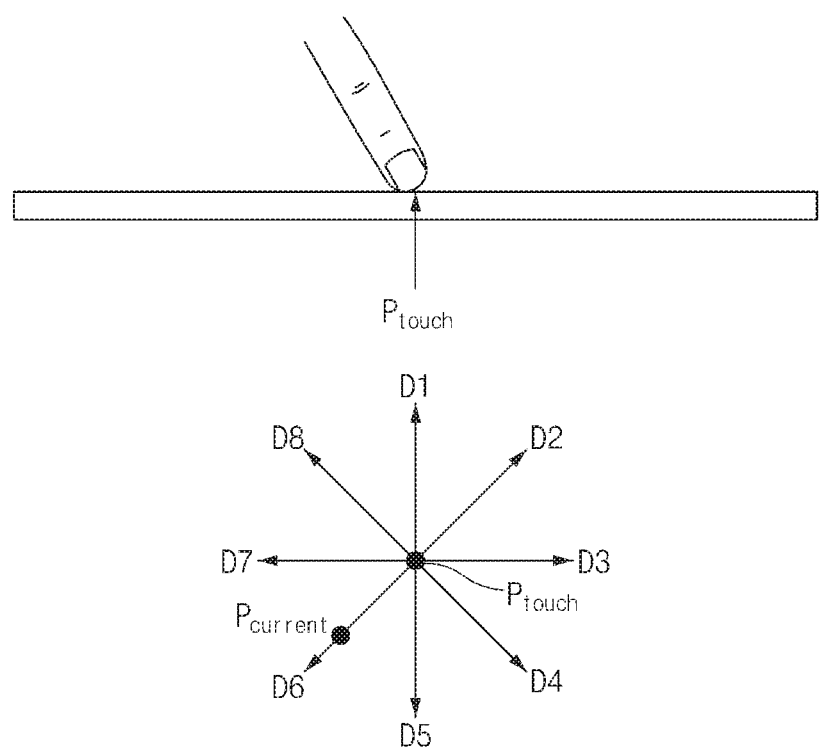
FIG. 3 is a view illustrating a direction of a pressing force according to a force touch according to an exemplary embodiment of the present disclosure.

FIG. 3 is a view illustrating a direction of a shear force according to a force touch according to an exemplary embodiment of the present disclosure.

When the user's finger applies a force touch to a point of the touch plate 110, the controller 210 collects force data measured from a plurality of measurement points through the force sensor 120. The controller 210 calculates a touch position $P_{touch}$ using the collected force data. The touch position $P_{touch}$, an actual touch position, is a touch position first calculated regarding the force touch input.

When the user's finger, maintained in a state of being in contact with one point, applies a pressing force, while tilting in one direction, the controller 210 measures a plurality of pieces of force data through the force sensor 120, and calculates a touch position using the plurality of pieces of measured force data. The controller 210 calculates a vector based on a previously calculated touch position as a start point and a currently calculated touch position as an end point. That is, the controller 210 calculates a direction of a shear force based on the force touch using the calculated touch positions. The direction of the shear force may be divided into a plurality of directions. The direction of the shear force may be divided into eight directions (D1 to D8) as illustrated in FIG. 3, but the present disclosure is not limited thereto.

For example, when the recognized touch position is changed from $P_{touch}$ to $P_{current}$, the controller 210 recognizes a pressing force direction as a sixth direction D6.

Figure 4:
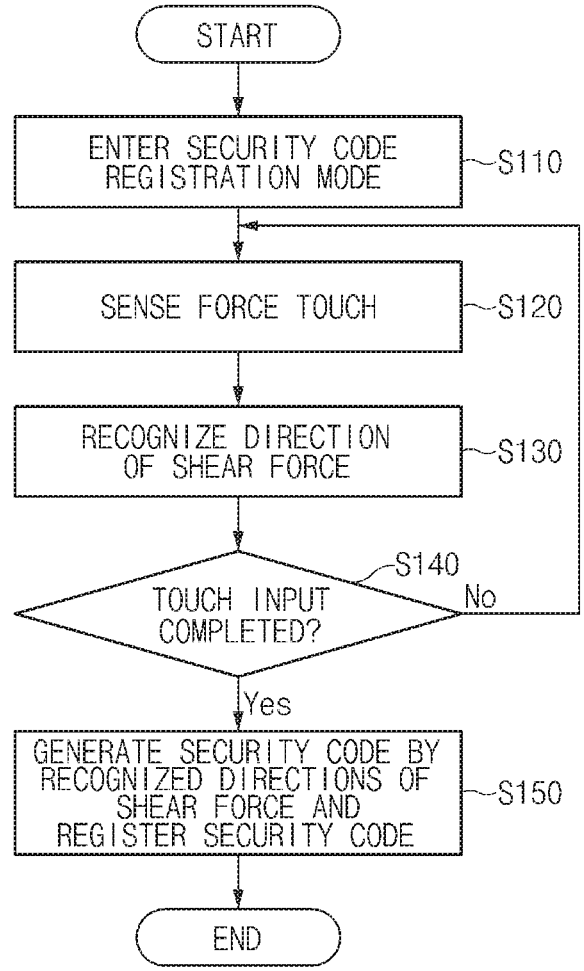
FIG. 4 is a flow chart illustrating a process of registering a security code of a security apparatus according to an exemplary embodiment of the present disclosure.

FIG. 4 is a flow chart illustrating a process of registering a security code of a security apparatus according to an exemplary embodiment of the present disclosure.

When there is a request for registering a security code from the user, the security processor 240 enters a security code registration mode in operation S110. For example, when a separately provided security code registration button is input, the security processor 240 enters the security code registration mode.

The security processor 240 senses a force touch applied to the touch plate 110 through the controller 210 in operation S120. When a force touch is applied to a certain point of the touch plate 110, the force sensors 120a and 120b of the force sensor 120 measure a magnitude (strength) of the pressing force. The controller 210 collects the measured magnitudes of the pressing force from the force sensor 120 at a predetermined period.

When a force touch is applied, the controller 210 recognizes a direction of the pressing force in operation S130. The controller 210 calculates a touch position using the measured magnitudes of the pressing force. The controller 210 recognizes a direction of a shear force on the basis of a change in a trace of the calculated touch positions. The controller 210 temporarily stores the recognized direction of the pressing force in the memory 300.

The security processor 240 determines whether the touch input has been completed in operation S140. When the touch input has not been completed, the security processor 240 recognizes the direction of the shear force at a predetermined period and temporarily stores the same in the memory 300.

When the touch input has been completed, the security processor 240 generates a security code with the recognized directions of the shear force and registers the generated security code in operation S150. When four or more directions of the shear force are recognized, the security processor 240 generates a security code with the recognized directions of the pressing force. For example, when the sixth direction D6, the third direction D3, the eighth direction D8, and the fourth direction D4 are sequentially recognized as direction of the shear force, the security processor 240 generates D6-D3-D8-D4 as a security code.

In the aforementioned exemplary embodiment, the case in which the user inputs a security code once is described as an example, but when a security code is registered, a security code to be registered may be repeatedly received two or more times and when the repeatedly input security codes match, the security code is registered.

Figure 5:
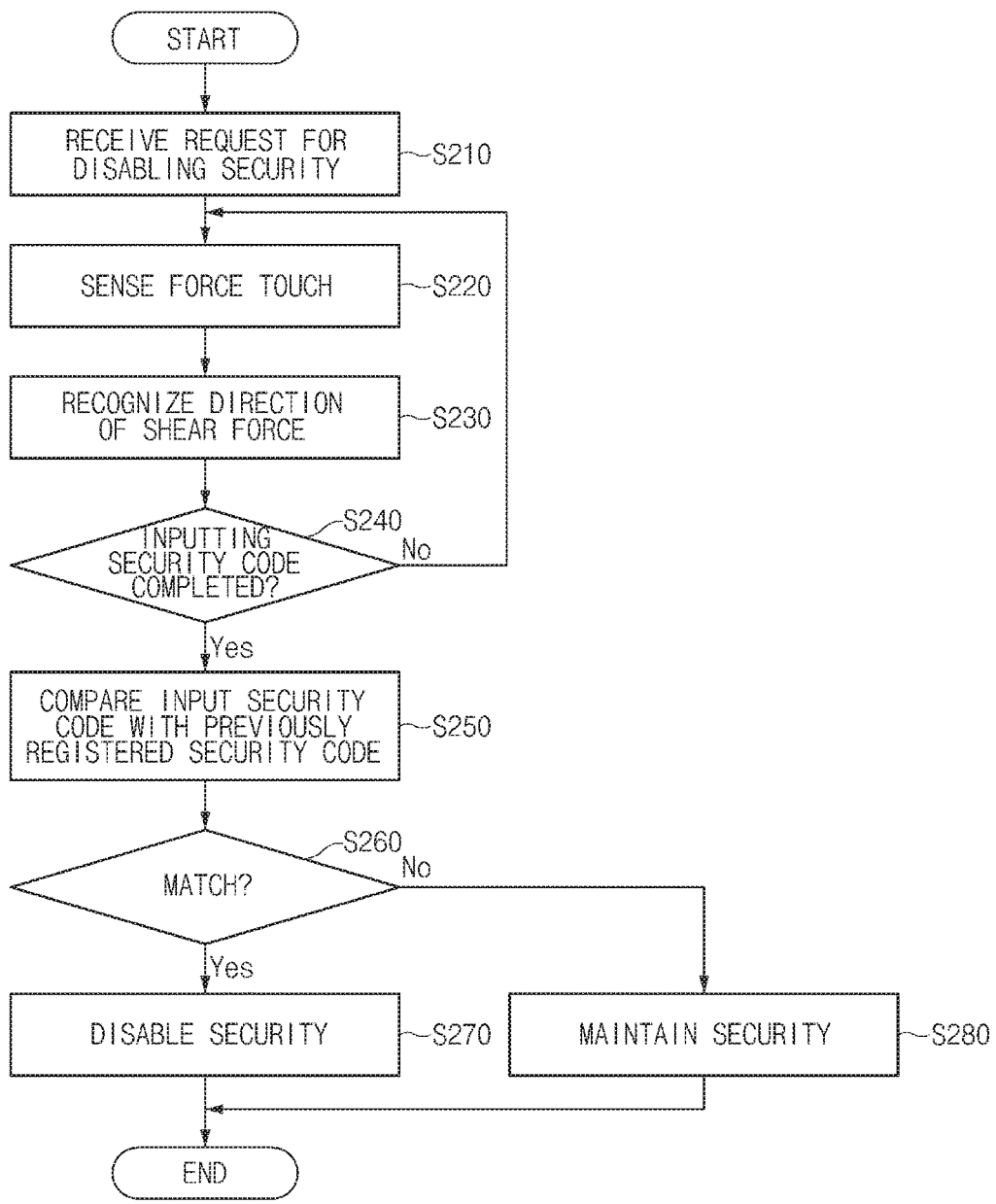
FIG. 5 is a flow chart illustrating a process of disabling security of a security apparatus according to an exemplary embodiment of the present disclosure.

FIG. 5 is a flow chart illustrating a process of disabling security of a security apparatus according to an exemplary embodiment of the present disclosure.

The security processor 240 receives a request for disabling security in operation S210. When there is a request for disabling security, the security processor 240 activates the touch input 100.

The controller 210 senses a force touch applied to the touch plate 110 under the control of the security processor 240 in operation S220. When the force touch applied to one point of the touch plate 110 is sensed, the force sensor 120 measures magnitudes of a pressing force and transmits the measured magnitudes to the controller 210.

The controller 210 calculates touch positions using the measured magnitudes of the pressing force and recognizes a direction of a shear force on the basis of a change in trace of the calculated touch positions in operation in operation S230. The controller 210 temporarily stores the recognized direction of the shear force in the memory 300.

The security processor 240 determines whether input of the security code has been completed in operation S250. The controller 210 determines whether the force touch is released. When the force touch is released, the controller 210 determines that input of the security code is completed.

The security processor 240 compares the input security code with a previously registered security code in operation S250. That is, the security processor 240 compares a sequence of input shear force directions and a sequence of shear force directions of the previously registered security code.

The security processor 240 determines whether the input security code matches the previously registered security code according to the comparison result in operation S260.

When the input security code matches the previously registered security code, the security processor 240 disables security in operation S270. Here, the security processor 240 outputs notification indicating the disabled security through the output 400.

If, however, the input security code does not match the previously registered security code, the security processor 240 maintains a security operation in operation S280. Here, the security processor 240 outputs warning indicating failure of disabling security through the output 400.

Figure 6:
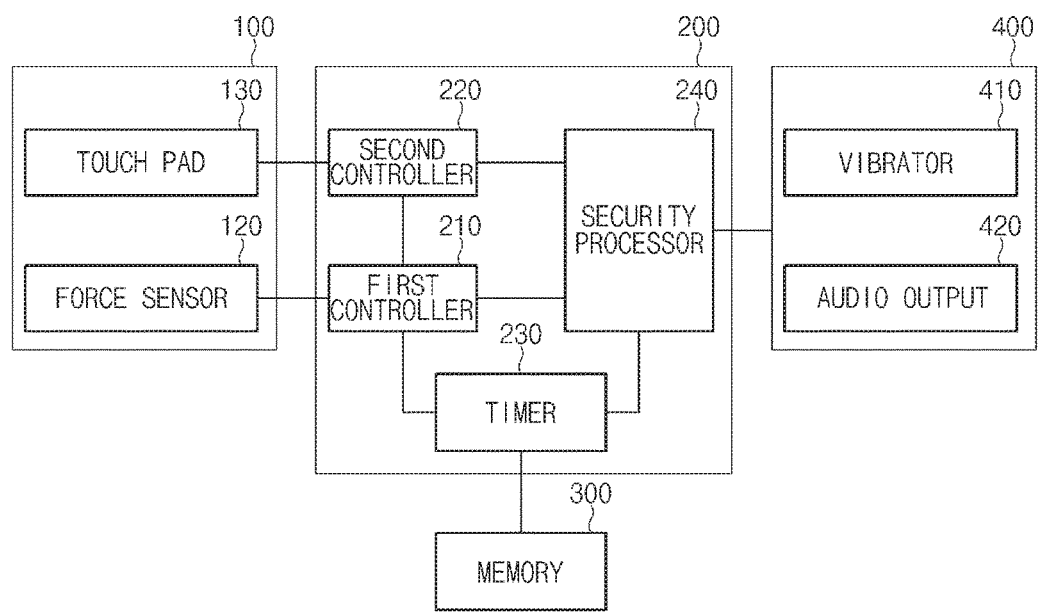
FIG. 6 is a block diagram of a security apparatus having a force-based interface according to another exemplary embodiment of the present disclosure.

FIG. 6 is a block diagram of a security apparatus having a force-based interface according to another exemplary embodiment of the present disclosure.

As illustrated in FIG. 6, the security apparatus includes a touch input 100, a processor 200, a memory 300, and an output 400.

The touch input 100, a force-based touch interface allowing for a force-based touch input, includes a force sensor 120 and a touch pad 130. A touch region of the touch input 100 in which a touch input is applied includes one or more of a region in which only a force-based touch (or a shear force touch) is allowed to be applied, a region in which only a general touch is allowed to be applied, and a region in which a general touch and a force-based touch are allowed to be applied.

The touch input 100 has such a structure as illustrated in FIG. 3, in which the touch plate 110 of FIG. 3 is replaced with the touch pad 130. The structure of the touch input 100 has been described, so a detailed description thereof will be omitted.

When an input part such as a user's finger, a stylus, and the like, contacts one or more points of a touch surface (a contact surface), the touch pad 130 senses the input part. The touch pad 130 uses any one touch recognition technology among resistive overlay, capacitive overlay, a surface acoustic wave, and an infrared beam. The touch pad 130 may also be implemented as a touch screen combined with a display.

When a surface of the touch pad 130 is touched, the force sensor 120 measures a pressing force having directionality applied to the touch pad 130 at a plurality of different measurement points. The force sensor 120 includes three or more force sensors and installed in different positions. For example, the force sensors are installed at four corners of the touch pad, respectively.

Here, as the force sensor, a strain gauge measuring a strain rate based on a touch force may be used.

The processor 200 includes a first controller 210, a second controller 220, a timer 230, and a security processor 240.

When a touch input is applied to a point of a touch surface of the touch pad 130, the first controller 210 and the second controller 220 sense the touch input and calculate a touch position. Here, the touch input is classified as a general touch and a force touch. The general touch refers to a behavior of bringing the user's finger into contact with one point of the surface (touch surface) of the touch pad 130, and the force touch refers to a behavior of applying a pressing force with a predetermined magnitude or greater when the user's finger touches one point of the touch surface of the touch pad 130.

When a touch input is applied to the touch pad 130, the second controller 220 receives a signal (or signals) corresponding to a touched point from the touch pad 130. The second controller 220 processes the transferred signal(s) and transmits a corresponding touch position (coordinate values) to the first controller 210 and the security processor 230. Here, the second controller 220 calculates central coordinates of a contact area contacted by the user's finger on the surface of the touch pad 130, as a touch position, on the basis of the transferred signal(s). Accordingly, the security processor 230 may be able to recognize a touched point of the touch pad 130.

When a force touch is applied to the touch pad 130, the first controller 210 receives signals measured (sensed) at respective measurement points (sensing points) from the plurality of force sensors. Here, the plurality of force sensors measure a magnitude of a pressing force applied to the touch pad 130. The first controller 210 calculates a magnitude and a direction of a shear force using the magnitudes of the pressing force measured by the plurality of force censors. Further, the first controller 210 may calculate a touch position using the measured magnitudes of the pressing force. Here, the first controller 210 calculates the touch position using a force-moment equation.

The first controller 210 calculates a direction of the shear force using a difference (error) between the touch position measured by the touch pad 130 and the touch position measured by the force sensor 120. For example, the first controller 210 calculates a vector based on the touch position measured by the touch pad 130 as a start point and the touch position measured by the force sensor 120 as an end point.

The first controller 210 determines the number of repeated inputs in the same direction of the shear force according to a time at which the force touch is input. The first controller 210 determines the number of repeated inputs having the same magnitude of the shear force according to the time at which the force touch is input.

The timer 230 measures a touch input time and outputs the measured time, or when a determined time has elapsed, the timer 230 generates an event signal. The processor 200 may have two or more timers 230.

When there is a request for registering a security code from the user, the security processor 240 executes registration of a security code according to a determined procedure. The security code is generated by any one of a touch position, a magnitude of a shear force, a direction of a shear force, a touch input time, and an idle time during which there is no touch input, or a combination of two or more thereof.

When there is a request for registering a security code, the security processor 240 controls the second controller 220 and the first controller 210 to activate the touch input 100. The security processor 240 recognizes touch inputs through the second controller 220 and the first controller 210. The security processor 240 generates a security code on the basis of the recognized touch inputs and registers (sets) the generated security code. That is, the security processor 240 stores the generated security code in the memory 300.

Thereafter, when there is a request for disabling security, the security processor 240 activates the touch input 100 to receive a security code from the user. The security processor 240 determines whether the security code input by the user matches a previously registered security code.

When the input security code matches the previously registered security code, the security processor 240 disables the security.

If, however, the input security code does not match the previously registered security code, the security processor 240 maintains the security operation. Here, security processor 240 informs the user about the mismatch between the input security code and the previously registered security code, in a form of one or more of visual information, audible information, and tactile information.

When the mismatch between the input security code and the previously registered security code is repeated by more than a determined number of times, the security processor 240 limits touch input during a determined time.

The memory 300 stores a mapping table, a security code, an audio signal, a touch position calculation algorithm, a shear force magnitude calculation algorithm, a shear force direction calculation algorithm, and the like. The memory 300 temporarily stores a force touch input applied through the touch input 100.

The memory 300 stores software for controlling an operation of the security apparatus, or the like. Input/output data according to an operation of the security apparatus is stored in the memory 300. In this embodiment, it is disclosed that the memory 300 is provide outside the processor 200, but the present disclosure is not limited thereto and the memory 300 may be disposed within the processor 200.

The output 400 outputs feedback, a sound effect, a warning signal, and the like, according to a touch input under the control of the processor 200. The output 400 includes a vibrator 410 and an audio output 420. The output 400 may include a display (not shown) displaying visual information.

The vibrator 410 generates a vibration strength and a vibration pattern corresponding to a touch input. The vibrator 410 may synthesize different vibrations and outputs or sequentially outputs the synthesized vibrations.

In the present exemplary embodiment, a case in which tactile information using vibration is output as a feedback signal is described as an example, but the present disclosure is not limited thereto and various design modification may be performed. For example, the output 400 may output tactile information based on a sense of cold and warmth using an element that can absorb or generate heat, as a feedback signal.

The audio output 420 outputs one or more of signals such as an alarm sound, a sound effect, a guide message, a warning message, and the like. The audio output 420 outputs a sound effect corresponding to a touch input under the control of the security processor 240.

Figure 7:
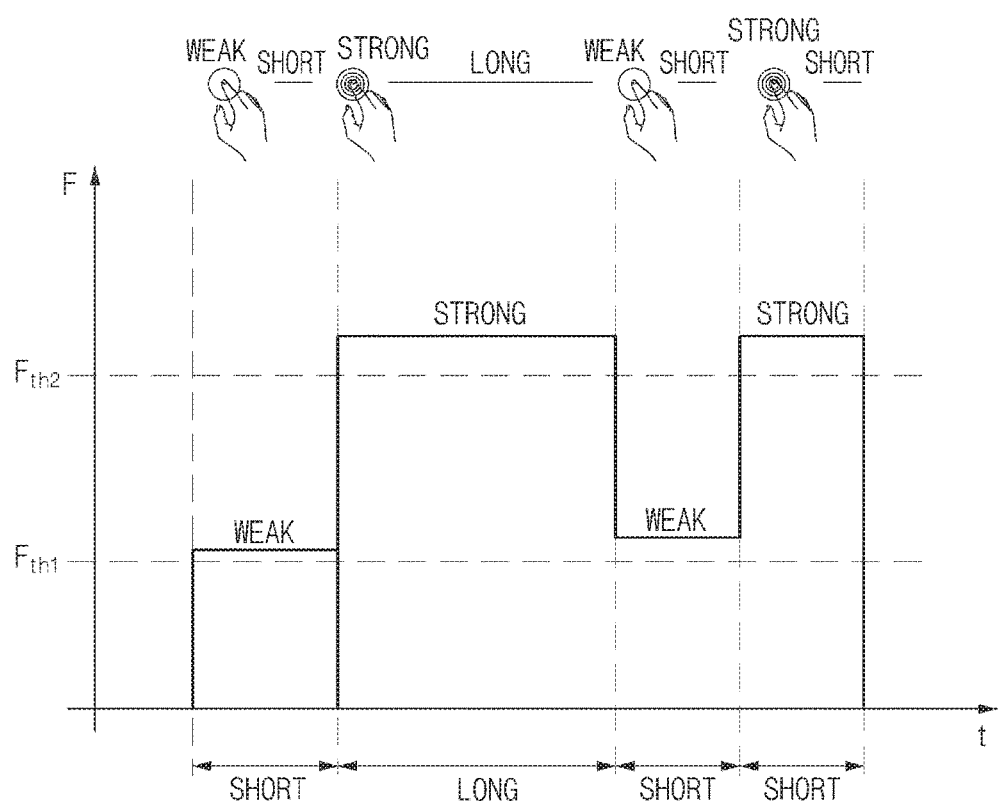
FIGS. 7 and 8 are views illustrating an example of a security code according to another exemplary embodiment of the present disclosure.
Figure 8:
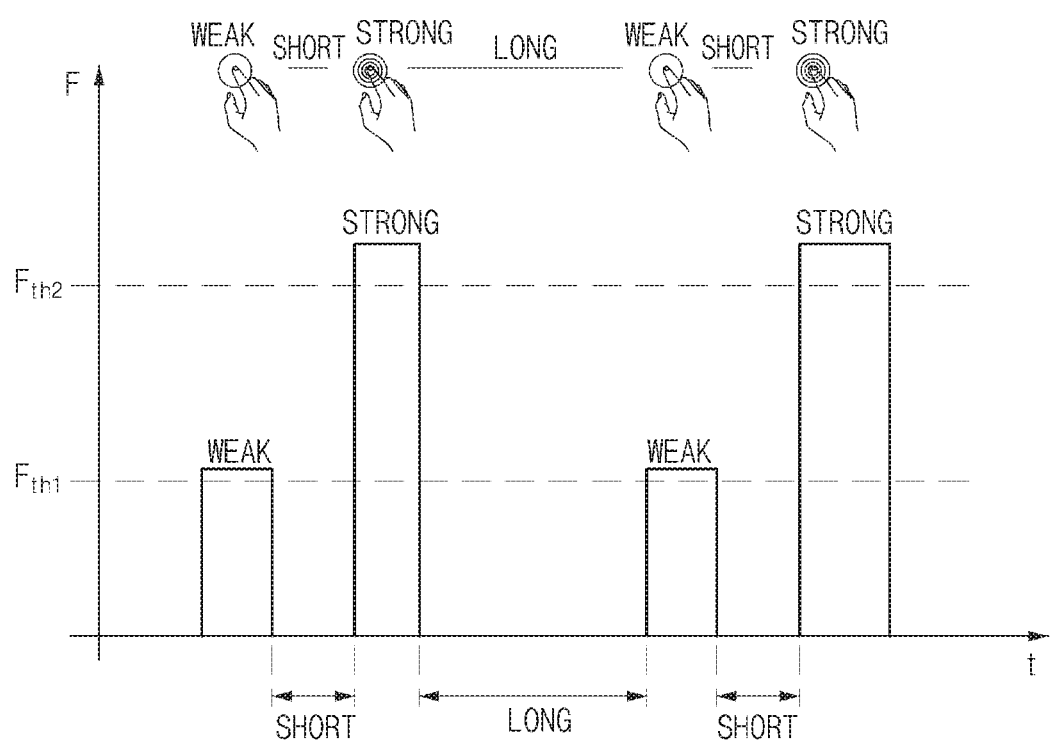

FIGS. 7 and 8 are views illustrating an example of a security code according to another exemplary embodiment of the present disclosure. In this embodiment, a magnitude of a shear force is classified as "strong" and "weak" and a time is classified as "long" and "short".

According to FIG. 7, a security code may be generated using a maintaining time of the same magnitude of a shear force as that of a recognized shear force. When a magnitude of a shear force exceeds a first threshold value $F_{th1}$, the processor 200 recognizes the magnitude as "weak," and when a magnitude of a shear force exceeds a second threshold value $F_{th2}$, the processor 200 recognizes the magnitude as "strong". When a maintaining time during which the same magnitude of a shear force is maintained is less than 3 seconds, the processor 200 recognizes the maintaining time as "short," and when a maintaining time during which the same magnitude of a shear force is maintained is more than 3 seconds, the processor 200 recognizes the maintaining time as "long."

Referring to FIG. 8, a security code may also be generated using a magnitude of a shear force and an idle time of a touch input. An idle time of a touch input is an interval between a present touch input and a next touch input. That is, the idle time refers to a time during which a touch input does not take place.

When a magnitude of a shear force exceeds the first threshold value $F_{th1}$, the processor 200 recognizes the magnitude as "weak," and when a magnitude of a shear force exceeds the second threshold value $F_{th2}$, the processor 200 recognizes the magnitude as "strong." The processor 200 further measures an idle time during which a shear force is maintained as "0" through the timer 230, and recognizes "long" or "short" depending on the measured idle time. For example, when the idle time is within 2 seconds, the processor 200 recognizes the idle time as "short", and when the idle time exceeds 2 seconds, the processor 200 recognizes the idle time as "long".

Figure 9:
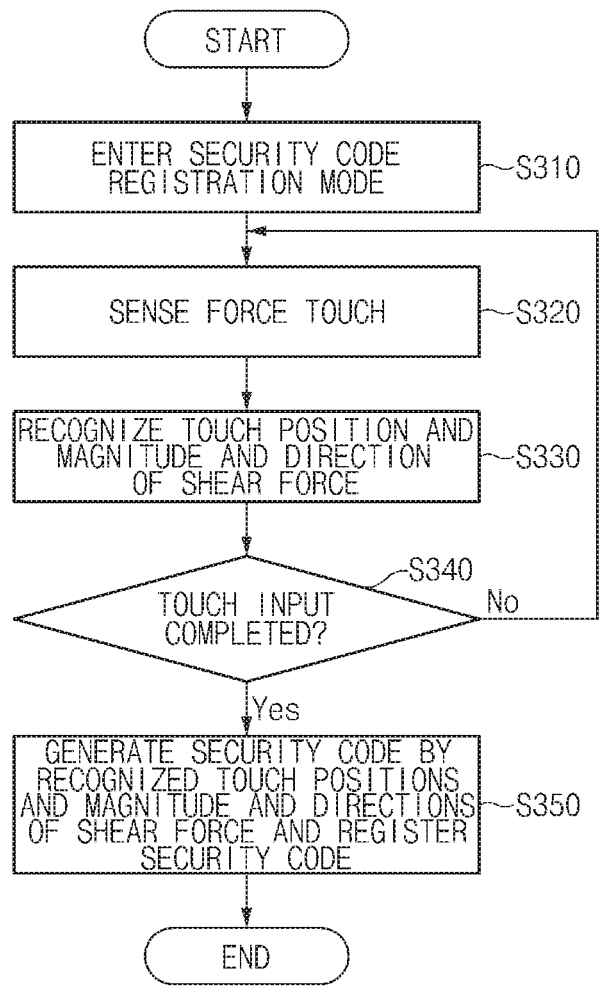
FIG. 9 is a flow chart illustrating a process of registering a security code of a security apparatus according to another exemplary embodiment of the present disclosure.

FIG. 9 is a flow chart illustrating a process of registering a security code of a security apparatus according to another exemplary embodiment of the present disclosure.

When there is a request for registering a security code from a user, the processor 200 of the security apparatus enters a security code registration mode in operation S310.

The processor 200 senses a touch input applied through the touch input 100 in operation S320. When a touch input is sensed, the processor 200 determines whether the corresponding touch input is a general touch or a force touch. The processor 200 calculates a magnitude of a shear force using magnitudes of a pressing force measured by the force sensors when a touch input was applied. When the calculated magnitude of the shear force is less than a threshold value, the processor 200 determines the touch input as a general touch, and when the calculated magnitude of the shear force is greater than the threshold value, the processor 200 determines the touch input as a force touch.

The processor 200 recognizes a touch position according to the touch input applied through the touch input 100 and a magnitude and a direction of the shear force in operation S330. The second controller 220 receives signal(s) corresponding to the touched point from the touch pad 130, processes the received signal(s), and outputs a corresponding touch position (coordinate values). The first controller 210 calculates the touch position on the basis of magnitudes of the pressing force measured by the plurality of force sensors. The first controller 210 calculates a direction of a shear force using an error between the calculated touch position and the touch position output from the second controller 220. In other words, the first controller 210 calculates a vector based on the touch position measured by the touch pad 130, as a start point, and the touch position measured by the plurality of force sensors, as an end point.

The processor 200 stores a recognized touch input order in the memory 300. In other words, the processor 200 stores a touch input order input as a combination of the touch position and the magnitude and the direction of the shear force in the memory 300.

The processor 200 determines whether the touch input has been completed in operation S340. When a signal indicating completion of the touch input is received, the processor 200 determines that the touch input has been completed. Alternatively, when there is no touch input during a preset period of time after the touch input is stopped, the processor 200 recognizes that the touch input has been completed.

When the touch input is completed, the processor 200 generates the recognized touch input order as a security code and registered the generated security code in the memory 300 in operation S350. The security code, as a recognized touch input order, is a touch input order input as a combination of one or two or more of a touch position, a magnitude of a shear force, a direction of the shear force, a touch input maintaining time, and a touch input idle time.

Figure 10:
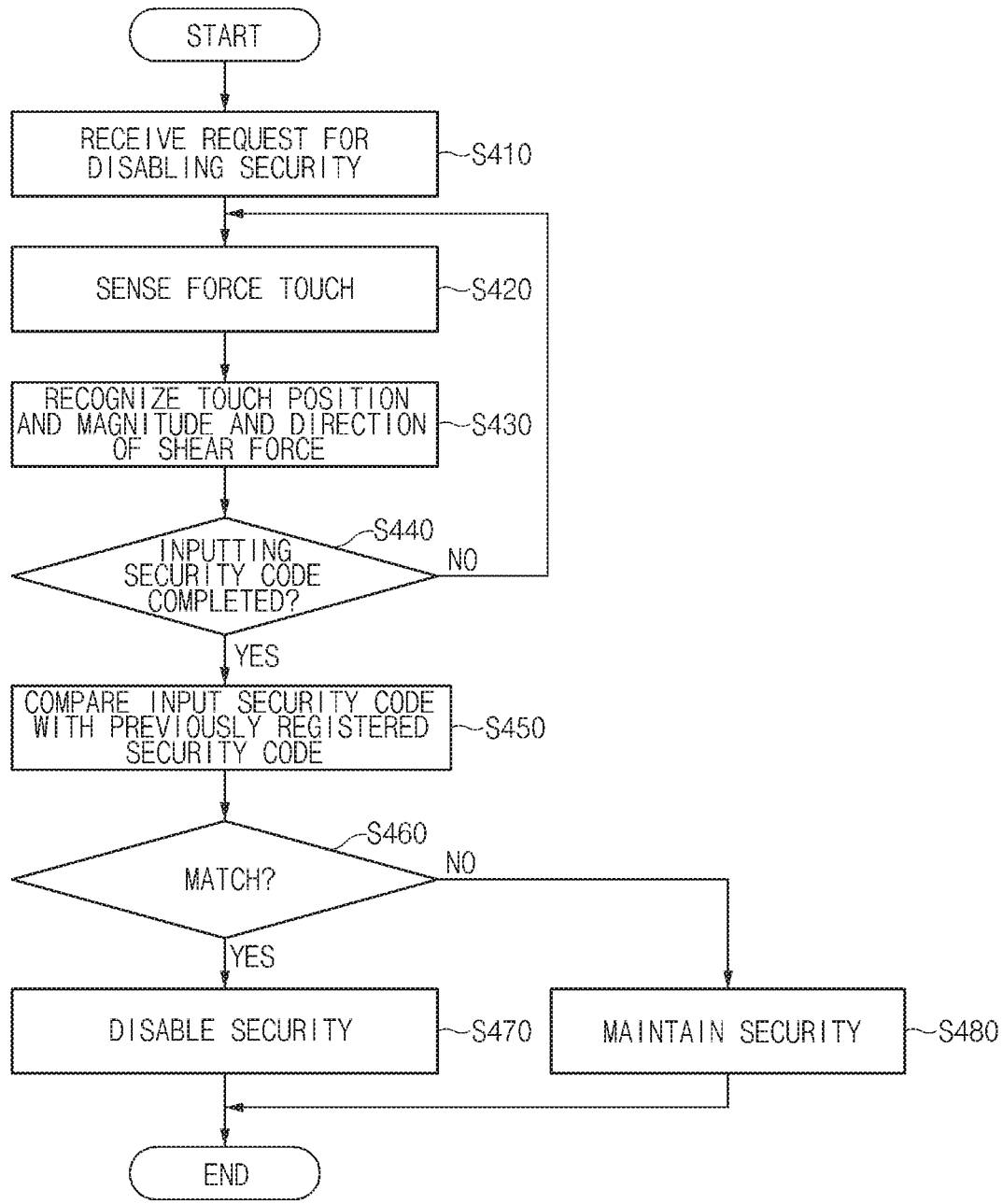
FIG. 10 is a flow chart illustrating a method for disabling security of a security apparatus according to another exemplary embodiment of the present disclosure.

FIG. 10 is a flow chart illustrating a method for disabling security of a security apparatus according to another exemplary embodiment of the present disclosure.

The processor 200 receives a request for disabling security from the user in a security operation state in operation S410. For example, when a touch applied to a touch surface of the touch input 100 is sensed or a separately provided button is input in an idle state, the processor 200 recognizes the sensed touch or the input button as a request for disabling security.

When there is a request for disabling security, the processor 200 senses a touch input applied through the touch input 100 in operation S420. Here, the first controller 210 measures a magnitude of a pressing force applied to the touch pad through a plurality of force sensors, and calculates a touch position on the basis of the measured magnitudes of the pressing force. The controller 220 measures a point where the touch took place.

The processor 200 recognizes a touch position according to the sensed touch input and a size and a direction of a shear force in operation S430. The first controller 210 recognizes a direction of the shear force using a difference between the calculated touch position and the touch position measured by the touch pad 130.

The processor 200 determines whether inputting a security code has been completed in operation S440. When inputting a security code has not been completed, the processor 200 continues to recognize a touch input and temporarily stores a recognized touch input order in the memory 300.

When inputting a security code is completed, the processor 200 compares the input security code with a previously registered security code in operation S450. The processor 200 determines whether the touch input order temporarily stored in the memory 300 matches a previously registered touch input order.

The processor 200 determines whether the input security code matches the previously registered security code in operation S460. When the input security code matches the previously registered security code, the processor 200 disables the security in operation S470.

If, however, the input security code does not match the previously registered security code, the processor 200 maintains the security operation in operation S480.

In the present exemplary embodiment, a case in which a touch input is generated as a combination of a touch position and a magnitude and a direction of a shear force is described as an example, but the present disclosure is not limited thereto and a touch input may also be generated as a combination of a magnitude and a direction of a shear force.

Since the user is not accustomed to an appropriate strength of a pressing force, a time input time, and the like, the security apparatus according to the present disclosure provides an input training such that an input method of the user is uniform before or after registering a security.

The security apparatus according to the present disclosure may set information set to distinguishably recognize a user's touch input through the force-based touch interface, differently, for each user. In other words, the security apparatus repeatedly measures a magnitude (strength) of a shear force, a touch input time, and the like, according to a user's touch input at an initial stage to set a valid range of an appropriate touch input recognition level.

As described above, according to the present disclosure, since a security code is generated as a combination of a touch position and a direction of a shear force using a force-based touch interface for recognizing a shear force, security may be enhanced.

According to the present disclosure, since the force-based interface utilizing the force sensor such as a strain gauge is provided, a high level of security may be maintained and easily used.

Further, according to the present disclosure, a fingerprint may not remain on the touch interface, and since there is no need to dispose number buttons, the security apparatus may be installed in a small area. The security apparatus according to the present disclosure may be utilized in various fields such as a digital doorlock, a vehicle glove box locking device, a vehicle door locking device, and the like.

Even though all of elements of the exemplary embodiments according to the present disclosure have been described as being coupled or as being coupled and operating as one element, the present disclosure is not limited to the exemplary embodiments. That is, to the extent of the purpose of the present disclosure, ail of such elements may be selectively coupled and operate as one or more elements. Such elements may be realized as each individual hardware, but all or part of such elements may be selectively combined into a computer program having a program module performing partial or all functions combined by a single or a plurality of hardware. Codes and code segments forming the computer program may be easily inferred by a person of ordinary skill in the art of the present disclosure. Such computer program may be stored in computer readable media read by a computer, is read and executed by the computer to thereby realize the exemplary embodiments of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A security apparatus having a force-based touch interface, the security apparatus comprising:
   a touch input including: a touch plate for a touch input; and a force sensor spaced apart at a predetermined distance by a connection member in a direction perpendicular to a touch surface of the touch plate, the force sensor configured to measure a pressing force applied to the touch plate at a plurality of measurement points; and
   a processor configured to recognize directions of a shear force using magnitudes of the pressing force measured by the force sensor, to compare the recognized directions of the shear force with directions of a shear force of a previously registered security code, and to determine whether to disable security according to a comparison result,
   wherein the processor calculates a first touch position and a second touch position which is spaced apart from the first touch position,
   wherein the second touch position is calculated using the magnitudes of the pressing force measured by the force sensor when the pressing force is applied to the first touch position of the touch surface, and
   wherein the processor calculates the second touch position using a force-moment equation,
   wherein the processor includes:
   a controller configured to recognize the directions of the shear force by tracking a change in a trace of a touch position using magnitudes of pressing forces measured through a plurality of force sensors; and
   a security processor configured to compare the directions of the shear force recognized by the controller with directions of a shear force of a previously registered security code, and to disable security or maintaining a security operation according to a comparison result.

2. The security apparatus according to claim 1, wherein the force sensor includes three or more force sensors connected to a surface opposing the touch surface of the touch plate through the connection member.

3. The security apparatus according to claim 2, wherein the three or more force sensors measure pressing forces in mutually different positions.

4. The security apparatus according to claim 3, wherein the three or more force sensors are strain gauges.

5. The security apparatus according to claim 1, wherein the controller calculates the touch position using the measured magnitudes of the pressing forces and calculates the directions of the shear force using a difference between the calculated touch position and a previously calculated touch position.

6. The security apparatus according to claim 5, wherein the controller determines the number of repeated inputs in a direction of a corresponding shear force according to an input time at which the same direction of a shear force is input.

7. The security apparatus according to claim 6, wherein the processor outputs a feedback according to the number of repeated inputs.

* * * * *